(12) United States Patent
Jensen

(10) Patent No.: US 8,246,837 B2
(45) Date of Patent: Aug. 21, 2012

(54) APPARATUS AND METHOD FOR REMOVAL OF AMMONIA FROM A MEDIUM

(75) Inventor: Poul Erik Bundgaard Jensen, Viborg (DK)

(73) Assignee: Skap Holding ApS, Viborg (DK)

( * ) Notice: Subject to any disclaimer, the term of this patent is extended or adjusted under 35 U.S.C. 154(b) by 413 days.

(21) Appl. No.: 12/311,994

(22) PCT Filed: Oct. 17, 2007

(86) PCT No.: PCT/DK2007/000447
§ 371 (c)(1),
(2), (4) Date: Apr. 22, 2009

(87) PCT Pub. No.: WO2008/049427
PCT Pub. Date: May 2, 2008

(65) Prior Publication Data
US 2010/0065505 A1     Mar. 18, 2010

(30) Foreign Application Priority Data
Oct. 24, 2006   (DK) ................................ 2006 01376

(51) Int. Cl.
C02F 1/02         (2006.01)
C02F 1/52         (2006.01)
B01D 37/00        (2006.01)

(52) U.S. Cl. ........ 210/702; 210/709; 210/711; 210/723; 210/903

(58) Field of Classification Search .................. 210/205, 210/702, 709, 903
See application file for complete search history.

(56) References Cited

U.S. PATENT DOCUMENTS

| | | | | |
|---|---|---|---|---|
| 4,437,987 A | * | 3/1984 | Thornton et al. | 210/137 |
| 4,664,794 A | * | 5/1987 | Mackrle et al. | 210/188 |
| 5,294,348 A | * | 3/1994 | Horny et al. | 210/724 |
| 6,387,272 B2 | * | 5/2002 | Hirth et al. | 210/652 |
| 6,409,788 B1 | * | 6/2002 | Sower | 71/11 |
| 6,451,206 B1 | * | 9/2002 | Charbonneau | 210/170.09 |
| 7,722,768 B2 | * | 5/2010 | Abma et al. | 210/605 |

FOREIGN PATENT DOCUMENTS

| | | |
|---|---|---|
| AU | 7417274 A | 5/1976 |
| DE | 195 05 884 A1 | 8/1996 |
| DE | 101 55 977 A1 | 5/2003 |
| JP | 2000 117289 A | 4/2000 |

* cited by examiner

Primary Examiner — Tony G Soohoo
Assistant Examiner — Peter Keyworth
(74) Attorney, Agent, or Firm — Jacobson Holman PLLC

(57) ABSTRACT

A method for removal of ammonia from a polluted medium avoids the disadvantages related to the chemical-physical properties of an ammonium-containing salt (MAP). The method has improved technical and economical operational parameters and produces a reusable and environmentally friendly nitrogen fertilizer. All chemical processes and mechanical steps of the method are carried out in one single container, with the different steps divided into time phases. The chemical products are prevented from transportation between compartments and contact with pumps and pipes. Only liquids without precipitates are in contact with these elements. The method is applicable to ammonia-containing water from leachate, wastewater, the food industry, and agriculture.

6 Claims, 2 Drawing Sheets

Phase 0 (Filling phase)

- Lift-sink unit in top position
- Adding of MP

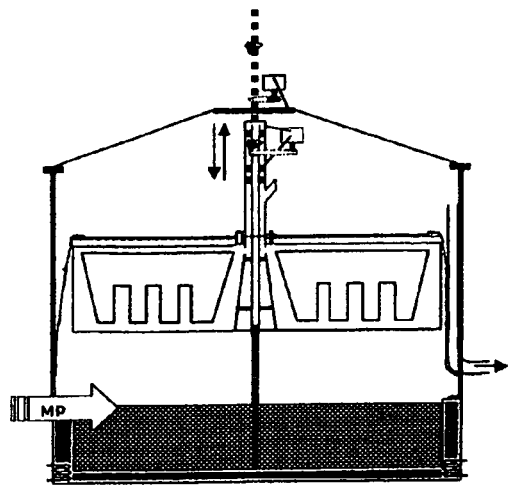

Phase 1 (Cleaning phase)

- Lift-sink unit in top position
- Supply of ammonium containing media by pressure
- Chemical reaction: MP + A -> MAP
- Medium supplied by jet-stream --> mixing
- Mixing-cleaning unit starts
- Separation of liquid/MAP via filter
- Cleaned medium discharged
- MAP retained in container

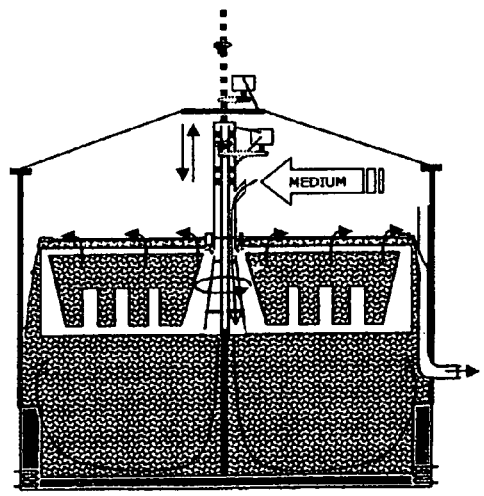

Phase 2 (Regeneration phase)

- Lift-sink unit to low position
- Gas collection cover installed
- Concentration of MAP.
- Mix-cleaning unit starts
- MAP heating
- Chemical reaction: MAP + heat --> MP + A(gas)
- Ammonia gas extraction and collection

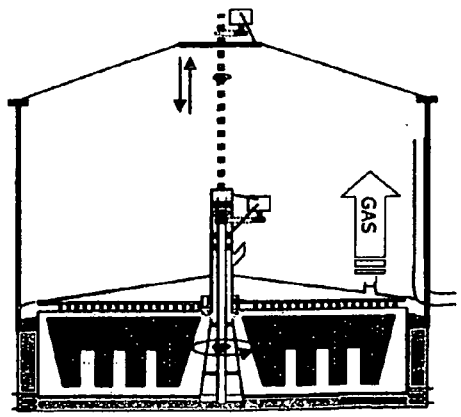

FIGURE 2

APPARATUS AND METHOD FOR REMOVAL OF AMMONIA FROM A MEDIUM

CROSS-REFERENCE TO RELATED APPLICATION

This is a national stage of PCT/DK07/000447 filed Oct. 17, 2007 and published in English, which has a priority of Denmark no. PA 2006 01376 filed Oct. 24, 2006, hereby incorporated by reference.

BACKGROUND OF THE INVENTION

1. Field of Invention

The invention concerns an apparatus (FIG. 1) and a method (FIG. 2) for removal of ammonia from a medium.

The apparatus is designed so that the apparatus in one single container has a combined function for:
1. chemical process unit
2. separation of the liquid and the solid fractions
3. mixing of the medium
4. concentration of solids
5. heating
6. ammonium extraction The apparatus consist of a process container (including a heater system) in which an elevator unit is placed with a combined function for lift-sink, filtration, mixing and cleaning. The elevator unit is kept water tight to the process container by means of a flexible membrane, so that a positive pressure can be maintained inside the process container for improving the filtration. The function of the process container is to carry out the chemical processes; the elevator unit has to function as a flexible filtration unit and as a concentration facility in the regeneration step; the mixing-cleaning unit of the elevator unit has the dual function to mix the medium and to clean the filter and the container surface for precipitations. The result of this design is that all unit processes can be carried out in the same container, without transportation of MAP/medium between different containers, and without MAP being in contact with pumps and pipes. Only the medium without MAP is in contact with pipes, pumps and other containers before and after the chemical processes and the filtration have taken place.

The apparatus use a method for removal of ammonia from a polluted medium, where the medium in a first chemical process in the process container is supplied with minimum one reagent, which causes a chemical reaction between the ammonia of the medium and the added reagents containing magnesium and phosphorous and/or a magnesium phosphate salt (MP), which causes precipitation of minimum one first ammonium-containing salt (MAP) in the process container, where a simultaneous pressure-accelerated filtration also occur resulting in a separation of the purified medium and MAP, where MP/MAP are retained by the filter, where the purified medium are pressed through the filter. Following in time the first chemical process and in the same container, a sinking of the elevator unit and a heating of the tank cause that MAP salt concentrates and the thermal process causes that ammonia (A) are liberated from MAP and are evaporated from the medium, so that the first reagents in the first chemical process can be recovered as magnesium phosphate (MP) and reused, and ammonia gas can be collected as a concentrated gas. The apparatus are designed so that both the first chemical process (A+M+P-->MAP), separation of MAP/purified medium, mixing of medium and the regeneration of MP (MAP-->A+MP) are carried out in the same container.

2. Description of the Prior Art

It is already known from chemical reaction plants to add reagents to a medium with a following separation of precipitation products from the medium. It is also known that magnesium, phosphate and ammonia under specific process conditions precipitate as MAP. This process occurs for example in heat exchangers on biogas plants. Biological removals of ammonia by nitrification-denitrification, where ammonia are released as free nitrogen to the atmosphere are also a well known process. That ammonia can be regenerated from MAP by a thermal process is also known from laboratory tests.

Own tests of the described chemical processes in full scale, has shown that MAP and MP are reagents having very special physical/chemical properties. These properties complicate transportation in pipes due to clogging, and also complicate the use of pumps due to precipitations in the pumps. Furthermore the chemicals are very wearing on mechanical items. Own tests has shown that it is very difficult to control a separation of MAP and MP from a liquid by using traditional separation systems as cyclones, band filters and other "passive" filter systems. The complications are caused by the precipitation of MAP/MP on mechanical parts and the small diameter of MAP/MP. The best results have been achieved by using a fine-mashed filter operating under positive pressure.

Own tests has shown that the technical, operational and economic performance are Improved if a special produced pH regulated magnesium phosphate salt (MP-pH) are added to the first chemical process instead of adding M and P as single chemical where uncontrolled addition results in loss of chemicals, primarily phosphorous. The MP-pH is a solid, that is only soluble in a ammonia solution, and own tests has shown an improved reaction ability of the chemical after the thermal process and after short time in a water solution.

SUMMARY OF THE INVENTION

The objective of the invention Is a chemical removal of ammonia from a medium in a plant unit that has all mechanical and all chemical processes in one single container and thereby eliminates all the technical inconveniencies and all transportation problems that occur due to the physical and chemical properties of the chemical precipitants, and to gain the best operational and economical results by applying a MP-pH salt directly in a batch, and to produce a ammonia product that can be utilized in a environmental friendly matter.

The application of the invention is mainly directed towards cleaning of:
1. Leachate from landfills
2. Reject water from sludge concentration facilities (municipal and industrial waste water)
3. Industrial waste water purification in combination with anaerobic purification
4. Agricultural slurry The result of the invention will be that ammonia nitrogen can be removed from a medium within a few minutes, and also result in a solution where anaerobic purification combined with the invention has great economical and operational advantages compared to existing methods.

The invention may advantageously apply a special produced pH regulated magnesium phosphate salt (MP-pH) manufactured particular to the specific medium. Herby may be achieved that a magnesium salt is precipitated. As an alternative for the invention manganese and/or calcium salt can be applied together with phosphate. Hereby is achieved that a manganese or calcium salt is precipitated.

The invention may advantageously take place in an apparatus for purification of a polluted medium, where the apparatus consist of a process container which is operated in three (3) phases (FIG. 2). In the first phase (Filling phase) the process container are filled with a pre-calculated amount of MP salt. In phase 2 (purification phase) a ammonia containing medium are supplied to the process container under positive pressure (e.g. from a pump), whereby ammonia (A) react with MP. The process container is a closed unit, constructed so that in the top of the container a filter mesh is installed to detain the MAP/MP salts. The pressure from the pump makes the purified liquid inside the process container penetrate the filter mesh so it can be discharged. The added amount of chemicals in the filling phase has a specific purification capacity so it can be operated continuously typically for several days. When the capacity of the added MP are exhausted the continuous purification phase are stopped, and the plant are turned into phase 3 (regeneration phase) where the elevator unit are sinked and the main part of the liquid are pressed out, and the remaining part of concentrated MAP salt are heated by installed heaters. Herby ammonia is liberated from MAP and leaves the tank as gas and are following collected.

By this operation all the reagents and ammonia can be recovered and applied for e.g. agricultural fertilizer.

The invention can advantageously be designed as one single container, in which all the unit operations are carried out: MAP reaction, separation, mixing, concentration of solids, MP regeneration and ammonia degassing.

The invention can advantageously be carried out in an apparatus that consist of 3 main elements, where the first main element is a process container, where the second main element is an elevator unit combining functions for pressure building, filtration, mixing and mechanical cleaning, where the third main element is a flexible, impermeable membrane.

The invention can advantageously be designed with build-in a temperature controlled heating units in the lower part of the container including means for heating the medium to a pre-designed optimal temperature for the regeneration phase.

The apparatus can advantageously be operated with a powerful downward jet stream supply of the medium to the central part of the diagonal placed pipe of the elevator unit, herby functioning as a jet stream for mixing of medium and precipitates in the lower part of the process container, where the same jet stream causes a simultaneous cleaning of the bearing between the elevator unit outer pipe and the mixing pipe, and by that protect precipitations from coming into contact with the bearings.

The invention can advantageously be designed without means for transportation of the medium through the different process phases and with out use of pumps or other mechanical transport equipment in contact with MAP/MP precipitate.

The invention can advantageously be designed as an apparatus where all processes take place in the same container with means for installation of rotating scrapers/brushes inside the container which in phase 2 are cleaning the subsurface of the filter and simultaneously mixing the medium and in phase 3 are cleaning the inside of the lower part of the heating unit of the container and simultaneously mixing the concentrated MAP/medium for increasing degassing of ammonia.

The invention can advantageously be designed with means for lifting and sinking the filter mesh, so that the process conditions are optimised in all phases.

The invention can advantageously be designed with a flexible membrane fixed between the container wall and the edge of the elevator unit in a way that enables the elevator unit to operate without risk of leakage or loss of pressure when transforming between phases.

The Invention can advantageously be designed with a removable and impermeable cover placed on the top of the elevator unit and installed with a connecting pipe for removal of ammonia gas produced In phase 3.

The invention can advantageously include means for measuring and regulating of pH of the medium, for obtaining optimal process conditions The invention can advantageously include means for measuring and regulating of temperature, for obtaining optimal process conditions in phase 3.

The invention can advantageously include means for measuring and regulating of pressure inside the process container for obtaining optimal process conditions for separation and pump operation.

BRIEF DESCRIPTION OF THE DRAWINGS

FIG. 2 shows the function of the invention and phase split-up.

Figure 1:
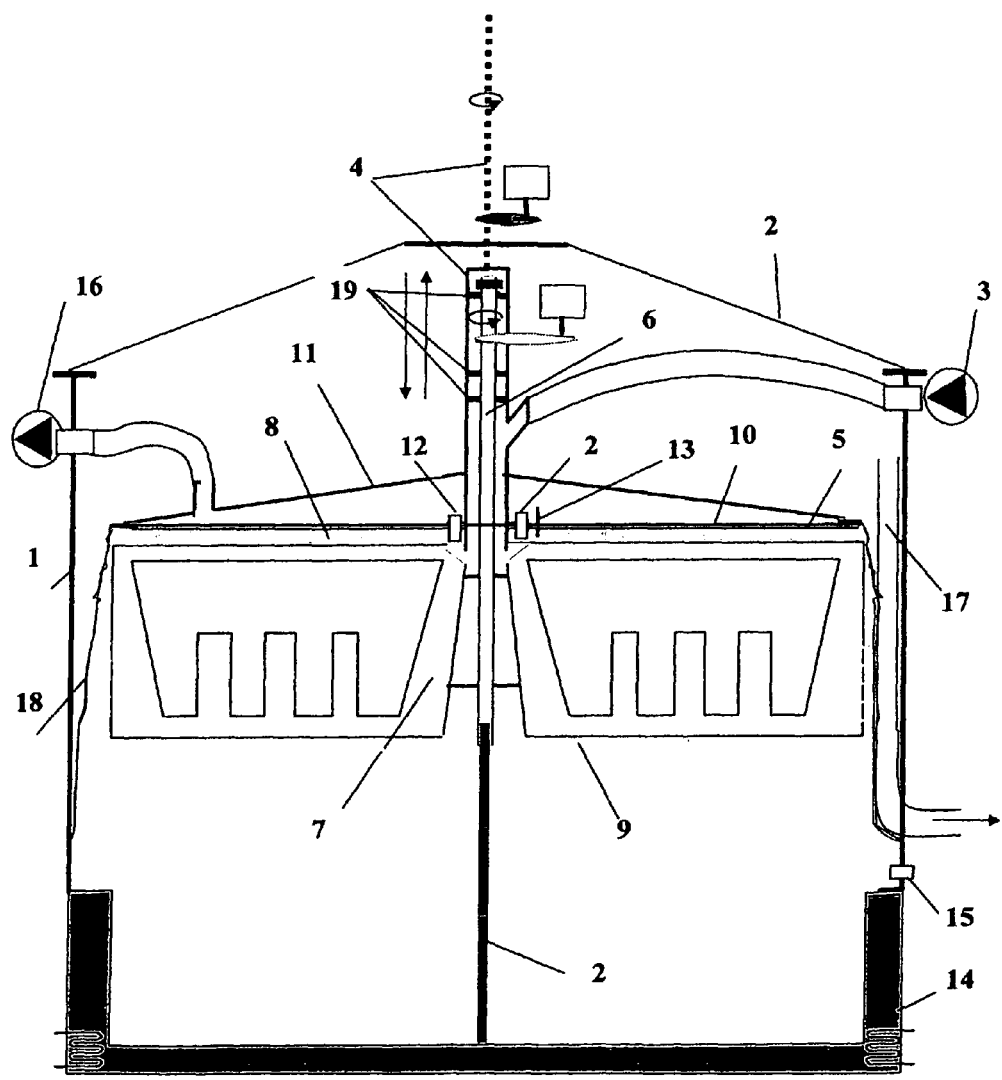
FIG. 1 shows the technical set up of the apparatus.

The main elements of the apparatus consist of a process container with a heating-unit, an elevator unit and a flexible membrane. The elevator unit consists of:
 A lift-sink part
 A filter part
 A mixing-cleaning part The sub-elements are shown in FIG. 1:
1. Process container
2. Supporting construction for elevator unit
3. Pump with flexible hose for supply of ammonia containing raw medium
4. Central pipe of the elevator unit including means for lifting-sinking the unit
5. Filter holder of the elevator unit
6. Central pipe of the mixing-cleaning part of elevator unit
7. Mixing blades of the mixing-cleaning part of elevator unit
8. Brushes installed on upper edge of the mixing-cleaning part of elevator unit for cleaning of the sub surface of the filter mesh
9. Brushes installed on the side edges and lower part of the mixing-cleaning part of elevator unit for cleaning the surface of the heat unit
10. Filter mesh mounted on the filter holder of the elevator unit
11. Removable and impermeable cover placed on the top of the elevator unit and installed with a connecting pipe for removal of ammonia gas.
12. Sensors for measuring pressure
13. Sensors for measuring temperature
14. Heating units with means for heating
15. Sensors for measuring pH
16. Vacuum pump with flexible hose
17. Perforated effluent pipe for cleaned medium
18. Flexible membrane
19. Bearings
20. Filling pipe for MP
21. Stabilisation bar The following numbers in brackets refers to FIG. 1.

The process container is designed as an open container (1) of varied diameter, typically 1.5-3.0 meter, depending of the desired plant capacity. The container may be manufactured in plastic, metal or other solid materials. The container may be provided with a construction (2) for supporting the elevator unit, alternatively supported by means outside the container. The container may be provided with a heating unit for operation of the plant in phase 3: regeneration. The process container is connected with the elevator unit by a flexible and impermeable membrane (18) which enables a positive pressure inside the process container, and therefore the medium will be pressed out of the process container via the filter installed at the top.

Elevator unit. Consist of a hollow vertical pipe which has means for lifting and sinking (4) installed at the top end of the pipe and the filter part (5 and 10) installed in the bottom end of the pipe and which in combination with the installed flexible membrane (18) creates a closed system only enabling the medium to leave the system via the filter mesh, and therefore makes it possible to change effective volume of the container and avoid leaks in the system during changes of phases. All water and gas connections is done in flexible hoses (3 and 16) to facilitate the elevator function. The elevator unit is mounted with means to lift and sink the unit, which are controlled and operated manually or automatically by installed pressure sensors (12).

Filter part of elevator unit. Are a part consisting of a circular frame (5), with a diameter 10-20 cm less than the diameter of the process container. The frame is fixed to the elevator unit, so that it always follows the vertical movements of the elevator unit. On the frame, a filter (10) of suitable material (metal, artificial materials) is mounted with the function to retain particles (MAP/MP) inside the container and allow flow through of purified medium. The mesh diameter depends on the process conditions, but will typically be In the range of 40-200 μm. The pressure below the filter may continuously be measured by installed pressure sensors (12), thereby control pressure loading of the filter and avoiding crack and leaks of the filter. On the filter there are mounted fittings for installation of pressure-, pH-, and temperature sensors.

Mixing-cleaning unit. Consist of a solid pipe (6) installed inside the hollow pipe of the elevator unit and fixed by bearings (19) and a stabilisation bar (21) fixed at the bottom of the process container. Between the two pipes a number of bearings are installed to fix the system and to facilitate the rotation of the mixing pipe. Means for rotating the pipe are installed.

Function of the Invention

FIG. 2 show the function of the invention and phase split-up

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

Application and Mode of Operation for the Plant:

The invention concerns an apparatus which advantageously may be used for removal of ammonia from a medium by a first chemical process (reaction 1) as well as for an other chemical process where ammonia In a concentrated form are regenerated from the product from the first reaction:

(Reaction 1)

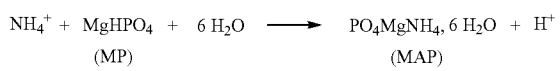

(Reaction 2)

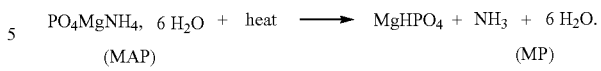

The invention may also advantageously be used for mixing the medium during the chemical processes, to separate the purified medium and the precipitated MAP/MP and to heat the chemical process in reaction 2.

The mode of operation for the invention are shown in FIG. 2, showing that the operation are divided in 3 different phases.

Phase 0: Filling phase: Chemicals (MP) are added to the process container via a filling tube (20). The amount of MP depends on the ammonia content in the medium.

Phase 1: Purification phase. This phase concerns the chemical reaction 1, where ammonia reacts with MP and forms MAP. This phase is running in a continuous mode. The elevator unit it placed in its upper position. An ammonia containing medium is added to the process container (1) by e.g. a pump (3). The medium is supplied via a connecting pipe in the central pipe of the elevator unit (4). The medium is supplied above the maximum water level of the container, and the medium has not yet reacted with the MP and therefore no precipitation occur in the pipe and also resulting in a minimum impact from precipitations on the bearings (19). The liquid is added under positive pressure, powerful and centrally towards the bottom of the container forming a jet stream which increases the mixing particular at the bottom. The medium, MP and MAP are also continuously mixed by the mixing-cleaning unit (7), which is rotated by means of a motor or similar. At the upper edge of the mixing blades a set of brushes (8) are mounted for cleaning the inner side of the filter mesh for precipitations. After a short retention time off the medium in the process container the chemical purification process has occurred and the ammonia has reacted with the MP and formed MAP, and the purified medium leaves the container via the filter mesh. A number of perforated pipes (17) are mounted between the outer tank side and the flexible membrane (18) to facilitate the discharging of effluent water. A pressure sensor (15) are continuously measuring the water pressure inside the process container for controlling the supply of medium to be able to control the pressure load at the filter mesh and to foresee clogging and/or leak of the filter (pressure loss/gain)

Phase 2: Regeneration phase. During this phase the chemical reaction 2 are carried out, where ammonia due to supply of heat, are liberated from MAP and MP are regenerated. The supply of medium stops and this phase are running in a batch mode. Elevator unit are pressed to lower position, so that MAP are concentrated to a level where mixing is still possible. Surplus medium are released to effluent before heating. Since volume are reduced the energy consumption to heating are minimized. On top of the filter a gastight cover (11) is installed for collection of the ammonia gas that evaporate from the MAP during the regeneration phase. The medium are heated and controlled by means of a heating unit (14) and temperature sensors (13) to a fixed temperature level. The mixer blades (7) are rotating to clean the wall sides of the container and also to accelerate the liberation of gas from the MAP/medium suspension. The liberated ammonia gas are removed by vacuum pump (16) and collected and may be processed and applied as fertilizer. When the MAP has been exhausted from all ammonia, the system cycle returns to phase 0 (if needed) and phase 1 again.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of cleaning a polluted medium containing ammonia, the method comprising, in the following order, the steps of:
   in a first chemical process, supplying the medium with a first chemical reagent including magnesium and phosphorous to effect a chemical reaction between the ammonia in the medium and the first chemical reagent, which results in precipitation of at least a first ammonium-containing salt;
   in a mechanical filtration process, separating the medium from the precipitation products;
   in a thermochemical reaction, decomposing the precipitation products into ammonia and a precipitate;
   removing the ammonia by vacuum; and
   using the precipitate as at least a portion of the first reagent in the first chemical process,
   the method being effected in an apparatus containing one single compartment in which all of the steps are carried out.

2. The method according to claim 1, wherein the first chemical reagent is $MgHPO_4$.

3. The method according to claim 1, wherein the precipitation products include $MgNH_4PO_4$.

4. A method of cleaning a polluted medium containing ammonia, the method comprising, in the following order, the steps of:
   in a first phase which is a batch phase, adding chemical reagents containing magnesium and phosphorous to a process container without supply of the medium;
   in a second phase which is a continuous phase, continuously supplying the medium to the process container, with the ammonia in the supplied medium reacting with the added chemical reagents from the first phase;
   separating the continuously supplied medium from the added chemical reagents and an ammonium-containing salt precipitate with a mechanical filter before discharge, with the ammonium-containing salt precipitate being retained in the process container and the ammonia-depleted medium being discharged to effluent via a filter mesh; and
   in a third phase which is a batch phase without supply of the medium, concentrating and heating precipitation products formed in the second phase, liberating the ammonia from the ammonium-containing salt precipitate and extracting the ammonia by vacuum, regenerating magnesium phosphate products for reuse in the first phase, and adding any makeup magnesium phosphate products required in the first phase.

5. The method according to claim 4, wherein in the first phase the added chemical reagent is $MgHPO_4$.

6. The method according to claim 4, wherein the precipitation products include $MgNH_4PO_4$.

* * * * *